(12) United States Patent
Merry et al.

(10) Patent No.: US 8,167,551 B2
(45) Date of Patent: May 1, 2012

(54) GAS TURBINE ENGINE WITH 2.5 BLEED DUCT CORE CASE SECTION

(75) Inventors: Brian D. Merry, Andover, CT (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 531 days.

(21) Appl. No.: 12/411,452

(22) Filed: Mar. 26, 2009

(65) Prior Publication Data

US 2010/0247306 A1  Sep. 30, 2010

(51) Int. Cl.
*F01D 1/02* (2006.01)
(52) U.S. Cl. .............. 415/208.2; 415/144; 415/145; 60/782; 60/785
(58) Field of Classification Search .......... 415/144, 415/145, 208.5, 208.2; 60/782, 785
See application file for complete search history.

(56) References Cited

U.S. PATENT DOCUMENTS

| | | | |
|---|---|---|---|
| 5,380,151 A | 1/1995 | Kostka et al. | |
| 5,477,673 A | 12/1995 | Blais et al. | |
| 6,035,627 A | 3/2000 | Liu | |
| 6,067,791 A | 5/2000 | Patel | |
| 6,122,905 A | 9/2000 | Liu | |
| 6,155,056 A | 12/2000 | Sampath et al. | |
| 6,647,730 B2 | 11/2003 | Liu | |
| 6,895,741 B2 | 5/2005 | Rago et al. | |
| 7,069,728 B2 | 7/2006 | Bruno et al. | |
| 7,114,519 B2 | 10/2006 | Aitchison et al. | |
| 7,147,426 B2 | 12/2006 | Leblanc et al. | |
| 7,156,619 B2 | 1/2007 | Papple | |
| 7,156,620 B2 | 1/2007 | Papple | |
| 7,189,055 B2 | 3/2007 | Marini et al. | |
| 7,229,247 B2 | 6/2007 | Durocher et al. | |
| 7,229,249 B2 | 6/2007 | Durocher et al. | |
| 7,266,941 B2 * | 9/2007 | Eleftheriou et al. | ......... 60/226.1 |
| 7,287,384 B2 | 10/2007 | Fish et al. | |
| 7,370,467 B2 | 5/2008 | Eleftheriou et al. | |
| 2005/0106009 A1 * | 5/2005 | Cummings et al. | .......... 415/145 |
| 2007/0137175 A1 * | 6/2007 | Moniz | .......... 60/226.1 |

* cited by examiner

*Primary Examiner* — Thinh T Nguyen
(74) *Attorney, Agent, or Firm* — Carlson Gaskey & Olds, P.C.

(57) ABSTRACT

A core case section for a gas turbine engine a multitude of discreet radial extending 2.5 bleed ducts defined in part by a rear structural wall.

20 Claims, 6 Drawing Sheets

GAS TURBINE ENGINE WITH 2.5 BLEED DUCT CORE CASE SECTION

BACKGROUND

The present disclosure relates to gas turbine engines; particularly bleed flow handling for gas turbine engines.

In gas turbine engines for use in powering aircraft, air is directed through multiple stage compressors. As the air passes through each successive compressor stage, the pressure of the air is increased. Under certain conditions, such as when the engine is operating at off design conditions, interstage bleed may be required to match the compressor stages.

To mitigate these conditions, gas turbine engines have incorporated bleed valves in the engine casing forward of the combustor which may open to rematch the compressor stages. These bleed valves have taken many forms from ports in the compressor casing which open via a movable valve element to devices which separate adjacent segments of the engine casing to thereby form an opening therebetween.

Although effective, direction of bleed flow into a secondary air flow may be relatively more complicated than a dump of the bleed flow overboard.

SUMMARY

A core case section for a gas turbine engine according to an exemplary aspect of the present disclosure includes a structural wall which at least partially supports a multiple of Fan Exit Guide Vanes. A multitude of discreet radial extending 2.5 bleed ducts are defined in part by the structural wall.

A gas turbine engine according to an exemplary aspect of the present disclosure includes a fan case section and a core case section defined about an engine axis of rotation. A multiple of fan exit guide vanes are mounted to the fan case section and the core case section. A structural wall of the core case section which at least partially supports the multiple of Fan Exit Guide Vanes and a multitude of discreet radial extending 2.5 bleed ducts are defined in part by the structural wall.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
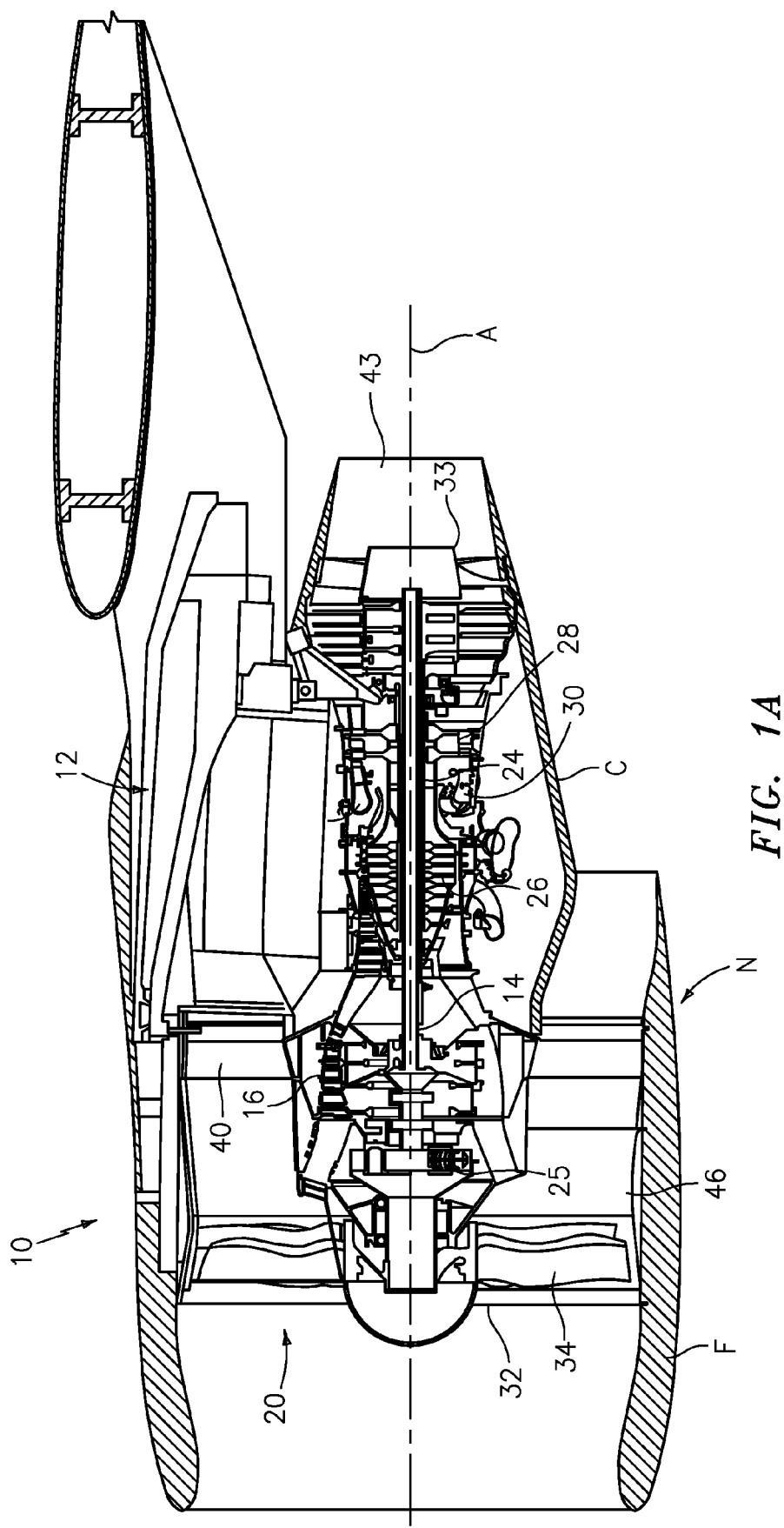
FIG. 1A is a general sectional view through a gas turbine engine along the engine longitudinal axis.
Figure 1B:
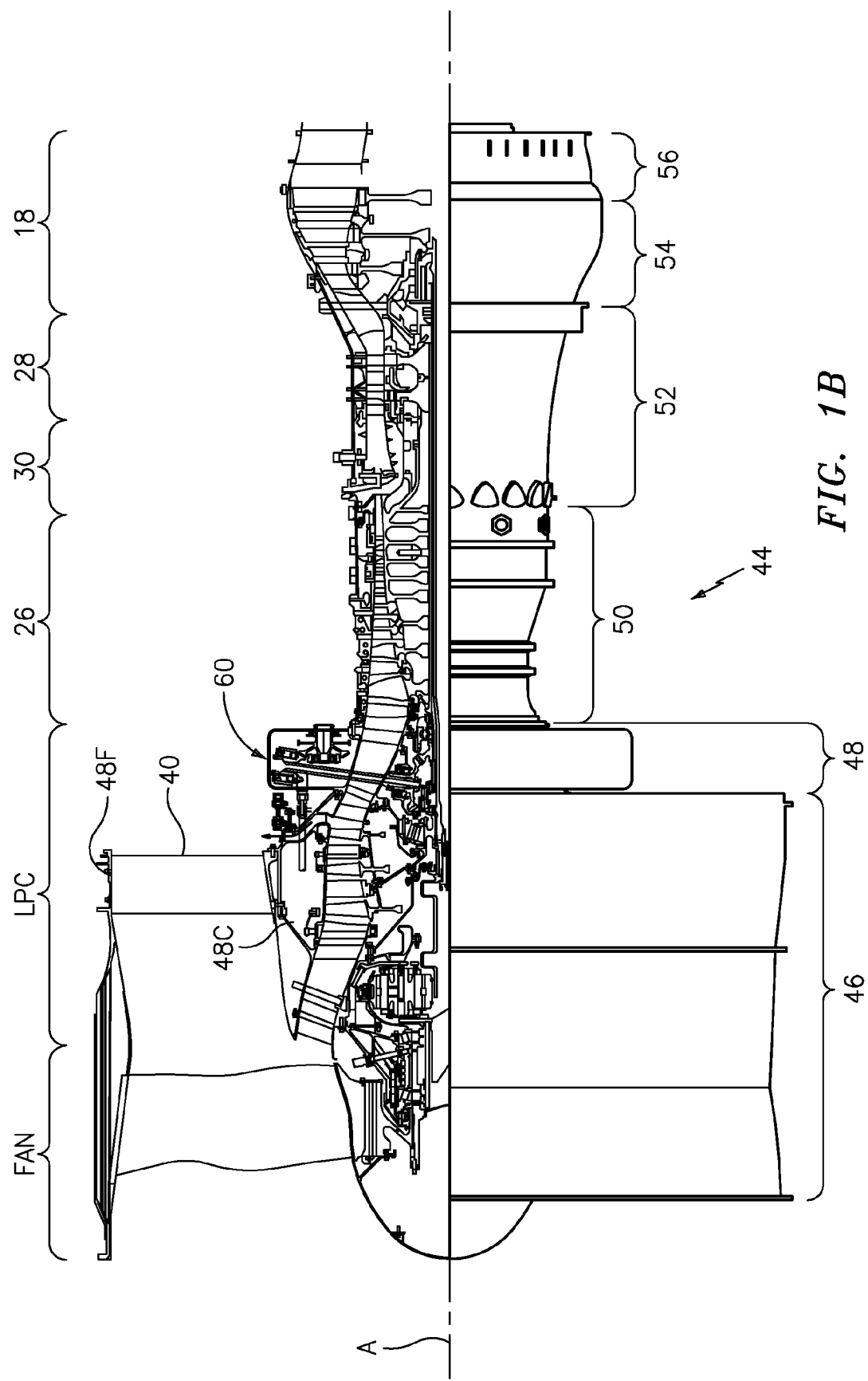
FIG. 1B is a general sectional view through a gas turbine engine along the engine longitudinal axis illustrating an engine static structure case arrangement on the lower half thereof.

FIGS. 1A and 1B illustrate a general partial fragmentary schematic view of a gas turbofan engine 10 suspended from an engine pylon 12 within an engine nacelle assembly N as is typical of an aircraft designed for subsonic operation.

The turbofan engine 10 includes a core engine within a core nacelle C that houses a low spool 14 and high spool 24. The low spool 14 includes a low pressure compressor 16 and low pressure turbine 18. The low spool 14 drives a fan 20 connected to the low spool 14 either directly or through a gear train. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Airflow enters the fan nacelle F which at least partially surrounds the core nacelle C. The fan section 20 communicates airflow into the core nacelle C to the low pressure compressor 16 and the high pressure compressor 26. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 to communicate a bypass flow. A core engine exhaust exits the core nacelle C through a core nozzle 43 defined between the core nacelle C and a tail cone 33.

The engine static structure 44 generally has sub-structures which may include a case structure often referred to as the engine backbone. The engine static structure 44 generally includes a fan case 46, an intermediate case (IMC) 48, a high pressure compressor case 50, a diffuser/turbine case 52, a low pressure turbine case 54, and a turbine exhaust case 56 (FIG. 1B). In the disclosed, non-limiting embodiment, the IMC 48 is mounted between the fan case 46 and the high pressure compressor case 50.

The fan section 20 includes a fan rotor 32 with a plurality of circumferentially spaced radially outwardly extending fan blades 34. The fan blades 34 are surrounded by the fan case 46. The core engine case structure is secured to the fan case 46 at the IMC 48 which includes a multiple of circumferentially spaced radially extending fan exit guide vanes (FEGVs) 40 which radially span a core case section 48C and a fan case section 48F defined about the engine axis A.

The IMC 48 may include an accessory gearbox case section 60 mounted thereto. The accessory gearbox case section 60 may be integral with or attachable to the IMC 48 or alternatively other engine static structure 44. The integrated accessory gearbox case section 60 provides significant radial area within the core nacelle C aft of the FEGVs 40 to support an engine accessory system (not shown).

Figure 2:
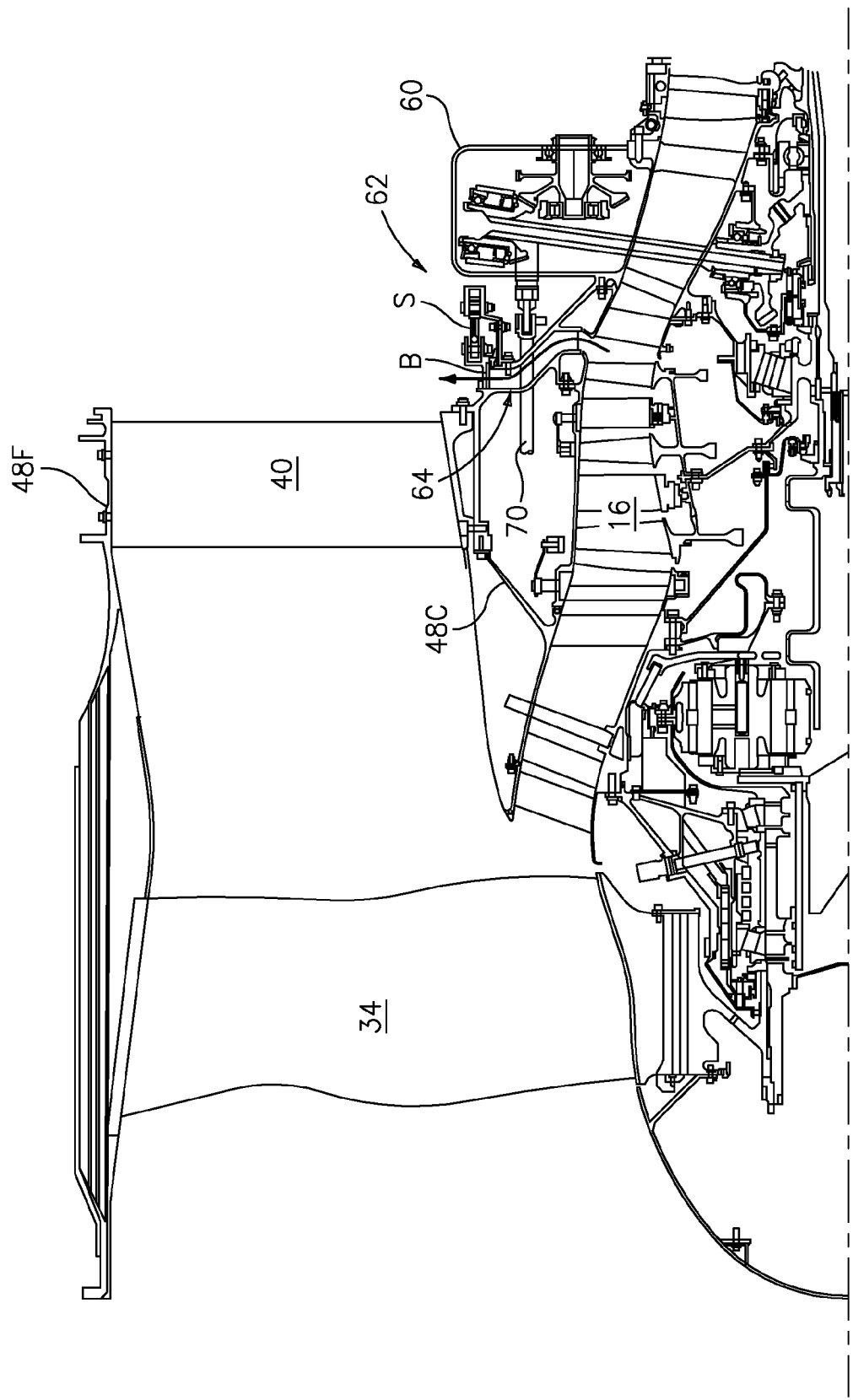
FIG. 2 is an expanded side sectional view through a gas turbine engine illustrating a 2.5 bleed duct structure integrated into a structural wall of a core case section.

Referring to FIG. 2, a 2.5 bleed duct structure 62 is integrated into a rear structural wall 64 of the core case section 48C to direct core airflow compressed by the low pressure compressor 16 to selectively exit out into the bypass flow stream through a bleed valve B (illustrated schematically) or other control. Location of the bleed valve B outside of the LPC cavity facilitates maintenance of the bleed valve B and an actuator system therefore. Location of the 2.5 bleed duct structure 62 just aft of the FEGVs 40 also facilitates an optimal distance between the fan blades 34 and the FEGVs 40.

The rear structural wall 64 is located radially inward of the FEGVs 40 to at least partially provide support therefore. It should be understood that the shape and configuration of the rear structural wall 64 may be of various forms.

Figure 3:
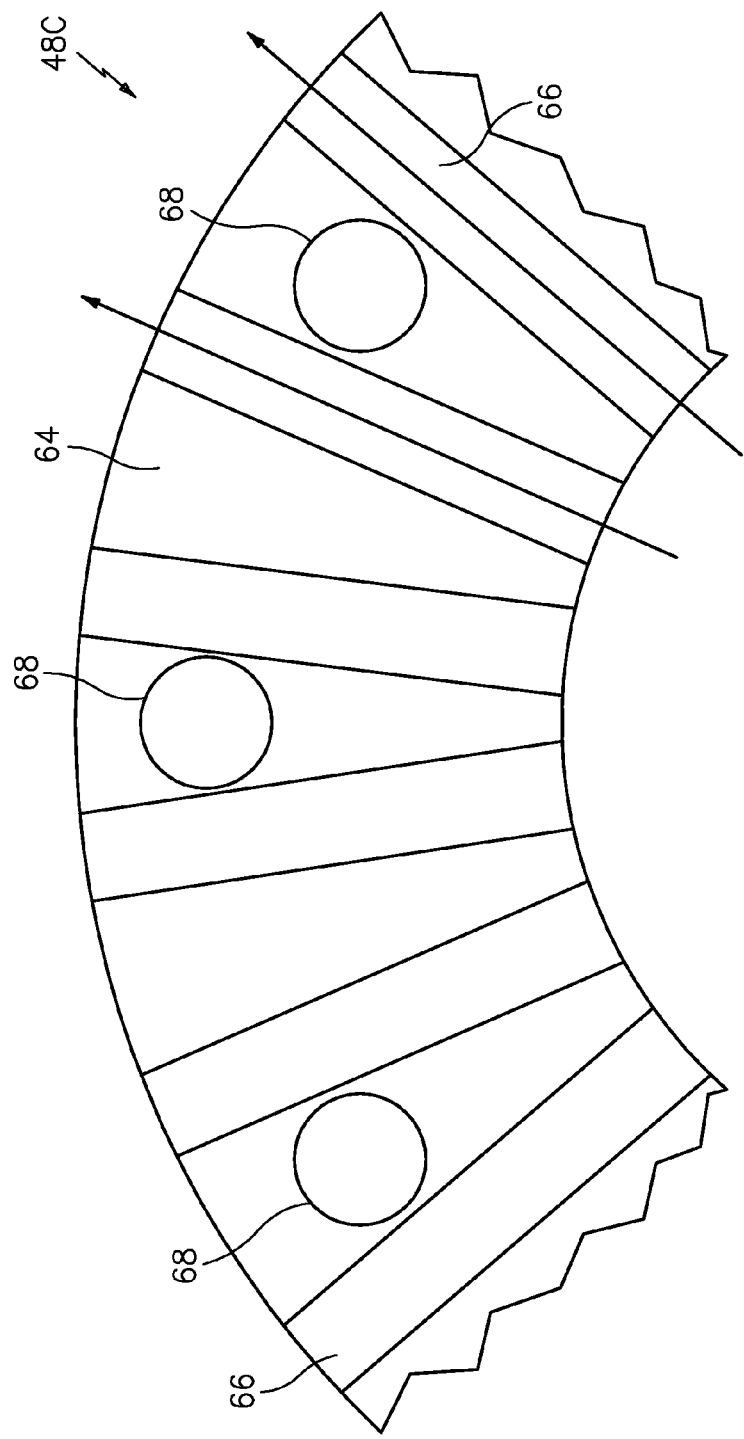
FIG. 3 is a face view of the 2.5 bleed duct structure integrated into the structural wall of the core case section.
Figure 4:
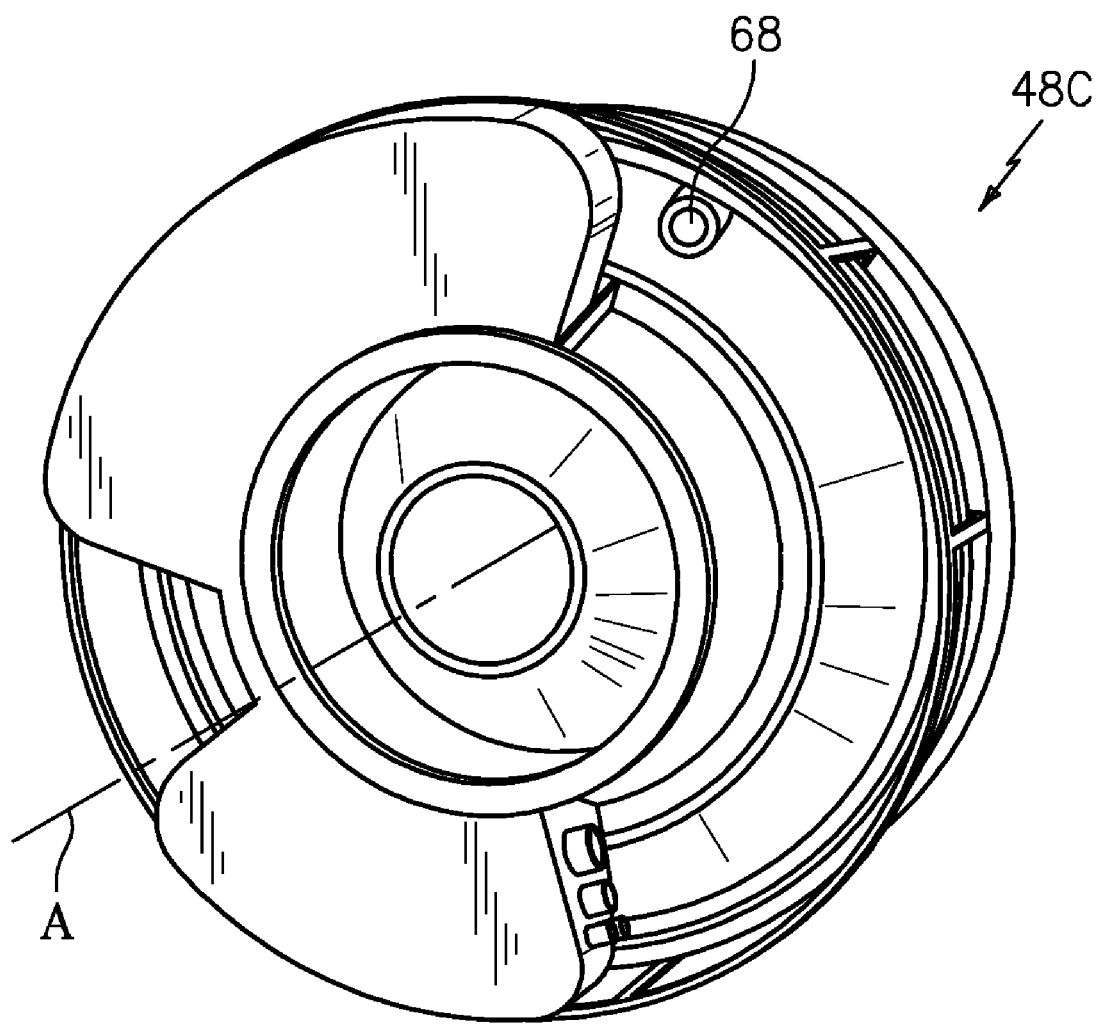
FIG. 4 is a perspective view of the core case section illustrating a service passage.

The bleed duct structure 62 includes a multitude of discreet radially extending 2.5 bleed ducts 66 (FIG. 3). At least one service port 68 is located through the rear structural wall 64 generally parallel to the engine axis A (FIG. 3) and between the 2.5 bleed ducts 66. The service port 68 facilitates passage of a pushrod 70 as illustrated. Additional service ports 68 (FIG. 4) may alternatively or additionally provide pass-through service for other flows and members such as conduits.

Figure 5B:
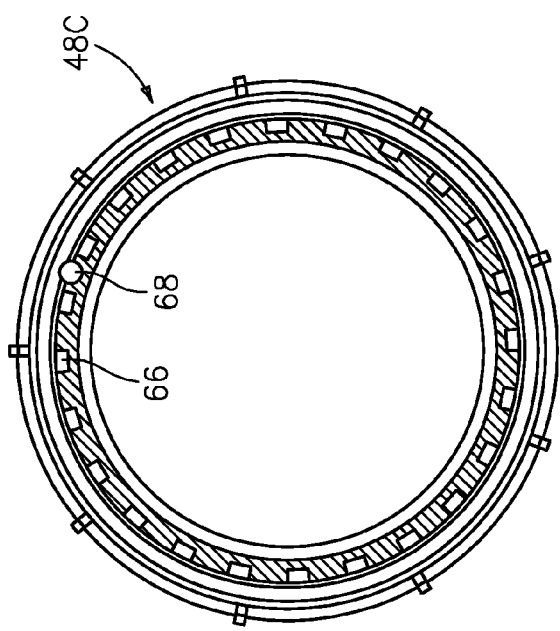
FIG. 5B is a sectional view through the 2.5 bleed duct structure of FIG. 5A taken along line 5B-5B.
Figure 5C:
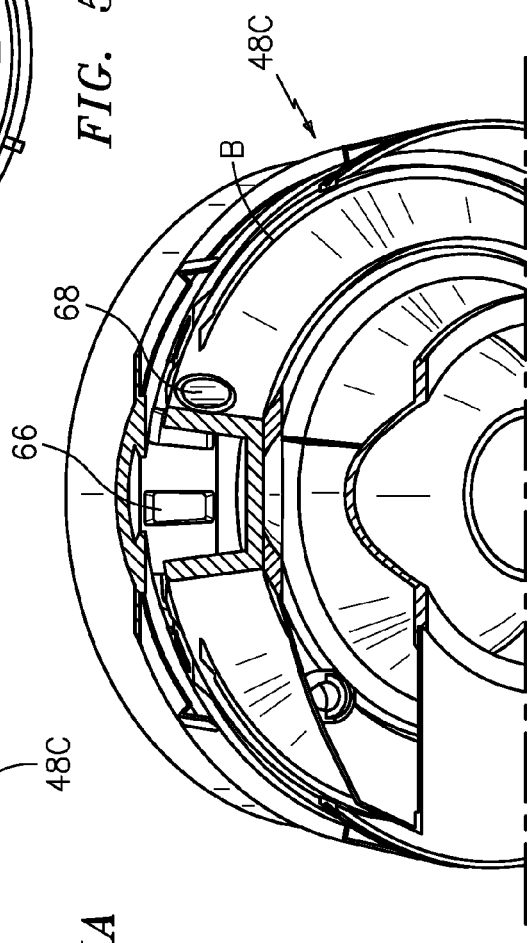
FIG. 5C is a sectional view through the 2.5 bleed duct structure of FIG. 5A taken along line 5C-5C.
Figure 5A:
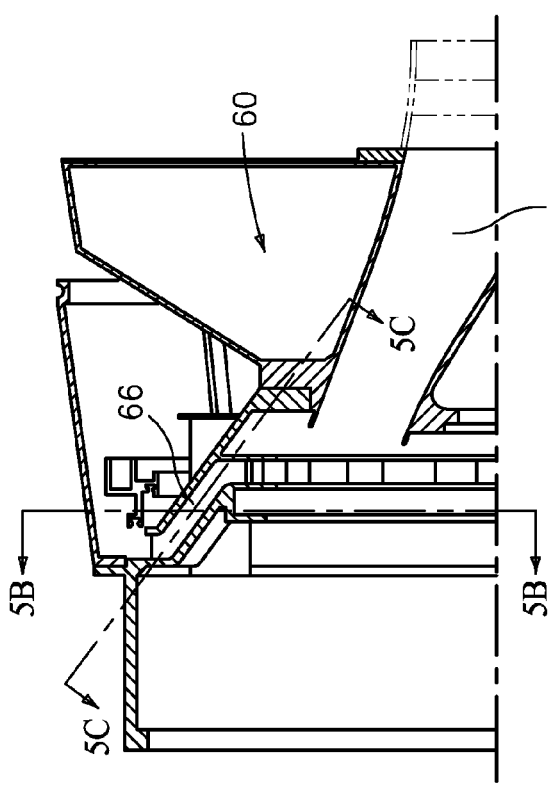
FIG. 5A is an expanded side sectional view through the 2.5 bleed duct structure integrated into a structural wall of a core case section.

Referring to FIG. 5A, the multitude of discreet radial extending 2.5 bleed ducts 66 extend around the engine axis A (FIGS. 5B and 5C). The multitude of discreet radial extending 2.5 bleed ducts 66 in one disclosed non-limiting embodiment are raked generally forward to exit just aft of the FEGVs 40 (FIG. 2).

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed:

1. A core case section for a gas turbine engine comprising:
   a rear structural wall which at least partially supports a multiple of Fan Exit Guide Vanes; and
   a multitude of discreet radial extending 2.5 bleed ducts defined at least in part by said rear structural wall.

2. The core case section as recited in claim 1, further comprising at least one service passage through said rear structural wall, said service passage generally parallel to an engine axis of rotation.

3. The core case section as recited in claim 1, wherein said multitude of discreet radial extending 2.5 bleed ducts are raked generally forward to define a respective multitude of exits just aft of said multiple of Fan Exit Guide Vanes.

4. The core case section as recited in claim 1, further comprising an accessory gearbox case section mounted to a case structure.

5. The core case section as recited in claim 4, wherein said core case structure is mounted between a fan case and a high pressure turbine case.

6. A gas turbine engine comprising:
   a fan case section defined about an engine axis of rotation;
   a core case section defined about said axis of rotation;
   a multiple of fan exit guide vanes mounted to said fan case section and said core case section;
   a rear structural wall of said core case section which at least partially supports said multiple of Fan Exit Guide Vanes; and
   a multitude of discreet radial extending 2.5 bleed ducts defined at least in part by said rear structural wall.

7. The gas turbine engine as recited in claim 6, further comprising at least one service passage through said rear structural wall, said service passage generally parallel to said engine axis of rotation.

8. The gas turbine engine as recited in claim 6, wherein said multitude of discreet radial extending 2.5 bleed ducts are raked generally forward to define a respective multitude of exits just aft of said the Fan Exit Guide Vanes.

9. The gas turbine engine as recited in claim 6, further comprising an accessory gearbox case section mounted to said core case section.

10. The gas turbine engine as recited in claim 6, wherein said core case section forms a portion of an intermediate case.

11. The core case section as recited in claim 1, wherein said multitude of discreet radial extending 2.5 bleed ducts are defined in a radial outward direction relative to said engine axis of rotation.

12. The core case section as recited in claim 11, wherein said multitude of discreet radial extending 2.5 bleed ducts are defined for at least a 90 degree circumferential arc about said engine axis of rotation.

13. The core case section as recited in claim 11, wherein said multitude of discreet radial extending 2.5 bleed ducts are defined for a 360 degree circumference about said engine axis of rotation.

14. The core case section as recited in claim 1, wherein said 2.5 bleed duct structure is axially aft of said multiple of Fan Exit Guide Vanes.

15. The core case section as recited in claim 11, wherein said 2.5 bleed duct structure is axially aft of said multiple of Fan Exit Guide Vanes.

16. The core case section as recited in claim 1, wherein said rear structural wall is axially aft of said multiple of Fan Exit Guide Vanes.

17. The core case section as recited in claim 11, wherein said rear structural wall is axially aft of said multiple of Fan Exit Guide Vanes.

18. The core case section as recited in claim 11, wherein said rear structural wall is transverse to said engine axis of rotation.

19. The gas turbine engine as recited in claim 1, further comprising at least one service passage through said rear structural wall, said service passage generally parallel to said engine axis of rotation and an accessory gearbox case section mounted to said rear structural wall.

20. The gas turbine engine as recited in claim 11, further comprising at least one service passage through said rear structural wall, said service passage generally parallel to said engine axis of rotation and an accessory gearbox case section mounted to said rear structural wall.

* * * * *